US008504241B2

(12) United States Patent
Hanna et al.

(10) Patent No.: US 8,504,241 B2
(45) Date of Patent: *Aug. 6, 2013

(54) SELF-CENTERING, TORQUE-SENSING JOINT ASSEMBLY FOR A PALLET TRUCK POWER STEERING SYSTEM

(75) Inventors: Timothy T. Hanna, Smithville Flats, NY (US); Richard M. Day, Port Crane, NY (US); James M. McDonough, Harpersville, NY (US); Jeffrey A. Coppola, Castle Creek, NY (US)

(73) Assignee: The Raymond Corporation, Greene, NY (US)

( * ) Notice: Subject to any disclaimer, the term of this patent is extended or adjusted under 35 U.S.C. 154(b) by 469 days.

This patent is subject to a terminal disclaimer.

(21) Appl. No.: 12/756,732

(22) Filed: Apr. 8, 2010

(65) Prior Publication Data

US 2011/0231059 A1 Sep. 22, 2011

Related U.S. Application Data

(63) Continuation-in-part of application No. 12/728,521, filed on Mar. 22, 2010.

(51) Int. Cl.
*B62D 1/20* (2006.01)
(52) U.S. Cl.
USPC ............................................. 701/41; 74/469
(58) Field of Classification Search
USPC ............... 701/41–44; 180/6.2, 6.24, 6.44, 180/6.48; 74/469
See application file for complete search history.

(56) References Cited

U.S. PATENT DOCUMENTS

| 4,336,860 | A | 6/1982 | Noller et al. |
| 4,666,011 | A | 5/1987 | Ohe et al. |

(Continued)

FOREIGN PATENT DOCUMENTS

| EP | 1106578 A1 | 6/2001 |
| GB | 1443263 | 4/1974 |

OTHER PUBLICATIONS

Honeywell Sensor Products, Linear / Angular / Rotary Displacement Sensors, ssec.honeywell.com online catalog, 900246, 8-00 Rev. B.

(Continued)

*Primary Examiner* — Yonel Beaulieu
(74) *Attorney, Agent, or Firm* — Quarles & Brady LLP

(57) ABSTRACT

A steering mechanism includes a handle with a tiller arm coupled to the handle via a flexible joint allowing relative movement of the handle about the tiller arm. A handle centering mechanism forming part of the steering mechanism includes a first end fixedly secured to the handle and a second end extending into a channel of the tiller arm. The second end compresses bumpers disposed on opposing sides of the second end. The bumpers urge the handle toward a neutral position wherein when a force is applied to move the handle away from a home position relative to the tiller arm, one of the compressed bumpers of the pair of compressed bumpers is further compressed. When the force is removed, the handle is returned to the home position by action of the pair of compressed bumpers. Preferably, the steering mechanism includes a torque sensing arrangement having a sensor and a magnet. The sensor produces a signal based on movement of the handle relative to the tiller arm by sensing changes in the magnet field of the magnet proportional to the torque exerted on the handle regardless of the angle of the tiller arm.

16 Claims, 10 Drawing Sheets

U.S. PATENT DOCUMENTS

| | | | |
|---|---|---|---|
| 4,828,066 | A | 5/1989 | Hayashi |
| 5,181,173 | A | 1/1993 | Avitan |
| 5,369,583 | A | 11/1994 | Hazelden |
| 5,394,760 | A | 3/1995 | Persson et al. |
| 5,636,137 | A | 6/1997 | Hazelden |
| 6,227,320 | B1 | 5/2001 | Eggert et al. |
| 6,276,219 | B1 | 8/2001 | Kube et al. |
| 6,276,485 | B1 | 8/2001 | Eriksson et al. |
| 6,290,010 | B1 | 9/2001 | Roudet et al. |
| 6,776,249 | B2 | 8/2004 | Fortin |
| 7,017,689 | B2 | 3/2006 | Gilliland et al. |
| 7,025,157 | B2 | 4/2006 | Lindsay et al. |
| 7,383,915 | B2 | 6/2008 | David et al. |
| 7,661,493 | B2 | 2/2010 | Rose |
| 7,789,188 | B2 | 9/2010 | Standke |
| 7,942,445 | B2 | 5/2011 | Kramer et al. |
| 2006/0166573 | A1 | 7/2006 | Vetta et al. |
| 2009/0032328 | A1 | 2/2009 | Wong et al. |
| 2009/0194363 | A1 | 8/2009 | Crabill et al. |
| 2011/0231058 | A1* | 9/2011 | Hanna et al. ............ 701/41 |

OTHER PUBLICATIONS

U.S. Appl. No. 12/728,521. Office Action dated Jun. 22, 2012. pp. 1-11.

* cited by examiner

SELF-CENTERING, TORQUE-SENSING JOINT ASSEMBLY FOR A PALLET TRUCK POWER STEERING SYSTEM

CROSS-REFERENCE TO RELATED APPLICATIONS

This application is a continuation-in-part application claiming priority to of co-pending U.S. patent application Ser. No. 12/728,521 filed on Mar. 22, 2010, and which is fully incorporated herein by reference.

STATEMENT CONCERNING FEDERALLY SPONSORED RESEARCH OR DEVELOPMENT

Not applicable.

BACKGROUND

This invention relates to power steering systems for material handling vehicles, and more particularly, to a self-centering, torque-sensing joint assembly disposed in a steering mechanism that detects operator steering intent for an electrically driven, hand-steered pallet truck regardless of angle of the steering mechanism.

Industrial material handling vehicles such as electric hand-steered pallet trucks are commonly found in warehouses, factories, shipping yards, and, generally, wherever pallets, large packages, or loads of goods are required to be transported from place to place. Pallet trucks typically include load bearing forks for lifting packages or pallets for transporting, an electric drive motor for propelling the truck, a steering control mechanism, and a brake.

A conventional steering mechanism includes a movable tiller arm mechanically coupled through a transmission housing to a steerable drive wheel. A control handle is connected to the tiller arm and may include speed, lift/lower, jog, and horn controls. To steer the pallet truck, an operator applies a force to the handle in the desired direction of travel. The steering force is transferred directly into the transmission housing via the tiller arm and the drive wheel is moved accordingly.

To facilitate manual steering, the tiller arm is generally several feet in length to provide sufficient leverage. Nevertheless the required steering effort can be greater in certain conditions when the tiller arm is necessarily oriented in a more vertical position, such as when negotiating within the confines of an over-the-road trailer or other limited-access location with a heavy load. Even when the tiller arm is oriented in a generally horizontal position, certain condition requires a larger than desired steering force, such as when the drive wheel is restrained by floor debris or a floor depression.

For these reasons, power steering assist, or "torque boost," systems have been developed for electrical hand-steered pallet trucks to provide an amount of steering assist to aid the operator. In these systems, the amount of steering assist is typically based on a torque value produced when an operator applies a steering force to the handle and measured in a horizontal plane about a steering axis of the pallet truck. As such, the sensitivity and therefore, accuracy, of these torque sensors is dependent on the angle of the tiller arm. Accordingly, the same amount of steering force exerted by an operator will result in different torque measurements at different tiller arm angles with respect to a plane of sensitivity of the torque sensor. Conventional steering assist systems do not account for changes in measured torque value due to tiller arm angle and thus, deliver varied and inconsistent steering assist.

For example, when a pallet truck with a conventional steering assist system is operating in very close quarters, i.e., with the steering mechanism in a near-vertical orientation, the torque sensor is least sensitive and accurate. Thus, the measured torque value is a fraction of what would be measured when the steering mechanism is in a near-horizontal orientation. Because of the discrepancy, the steering assist provided to turn the drive wheel is quite small, regardless of the amount of operator steering force applied to the steering handle.

Another challenge for conventional power assist systems is that the motion required to steer a pallet truck changes from a lateral force applied to the handle to a twisting force on the tiller arm as the steering mechanism changes from a horizontal position to a vertical one. This change in motion and steering force results in an inconsistent operation, level of steering assist, and 'feel' to the operator depending on the relative angle and position of the tiller arm and steering handle.

The present invention addresses these issues.

SUMMARY OF THE INVENTION

In one aspect of the invention, a steering mechanism for material handling vehicle, such as a pallet truck, is provided. The steering mechanism includes a handle with a tiller arm coupled to the handle via a flexible joint allowing relative movement of the handle about the tiller arm. A handle centering mechanism forming part of the steering mechanism includes a first end fixedly secured to the handle and a second end extending into a channel of the tiller arm. The second end compresses bumpers disposed on opposing sides of the second end. The bumpers urge the handle toward a neutral position wherein when a force is applied to move the handle away from a home position relative to the tiller arm, one of the compressed bumpers of the pair of compressed bumpers is further compressed. When the force is removed, the handle is returned to the home position by action of the pair of compressed bumpers. Preferably, the steering mechanism includes a torque sensing arrangement having a sensor and a magnet. The sensor produces a signal based on movement of the handle relative to the tiller arm by sensing changes in the magnet field of the magnet proportional to the torque exerted on the handle regardless of the angle of the tiller arm.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION

Figure 1:
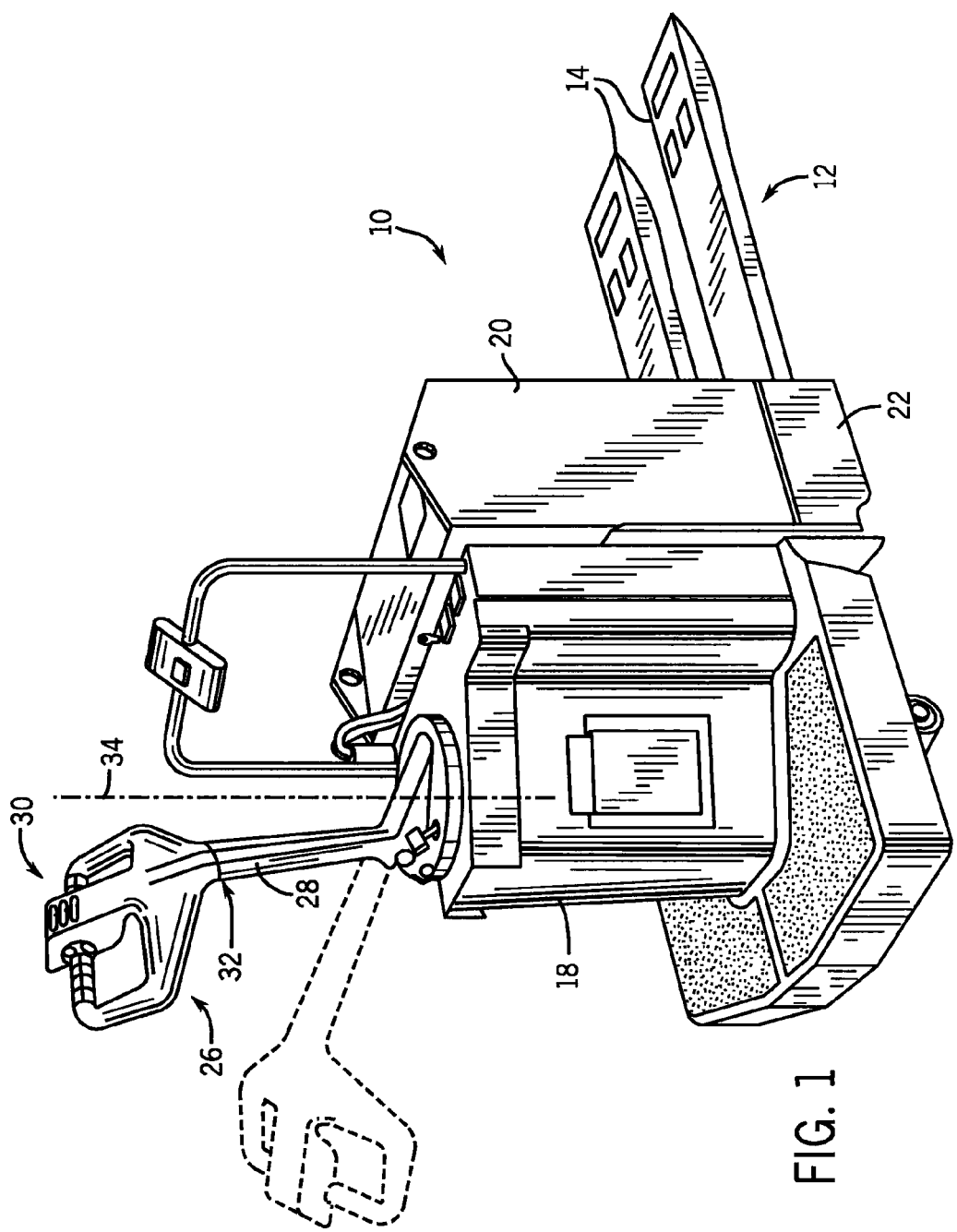
FIG. 1 is a perspective view of a pallet truck incorporating a power steering system and a self-centering, torque-sensing joint assembly disposed in a steering mechanism in accordance with an embodiment of the invention.
Figure 2:
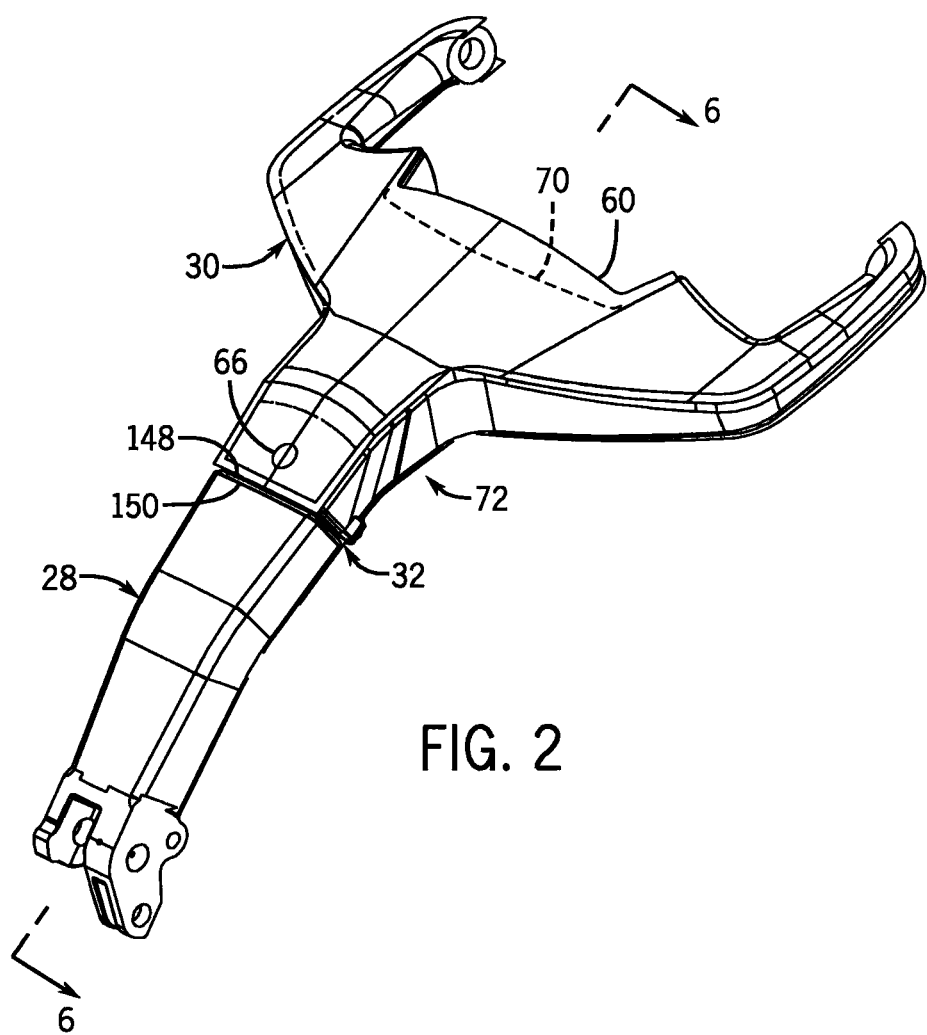
FIG. 2 is a perspective view of the steering mechanism of FIG. 1.
Figure 3:
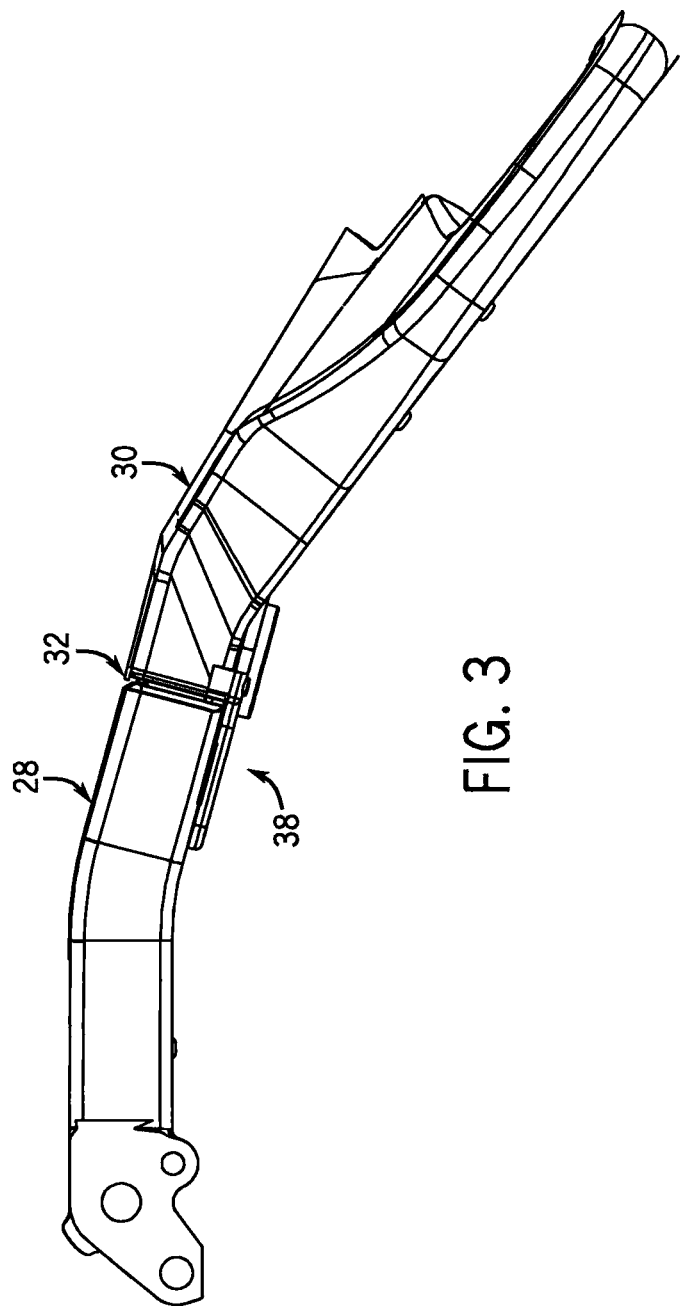
FIG. 3 is a side view of the steering mechanism of FIG. 1.
Figure 4:
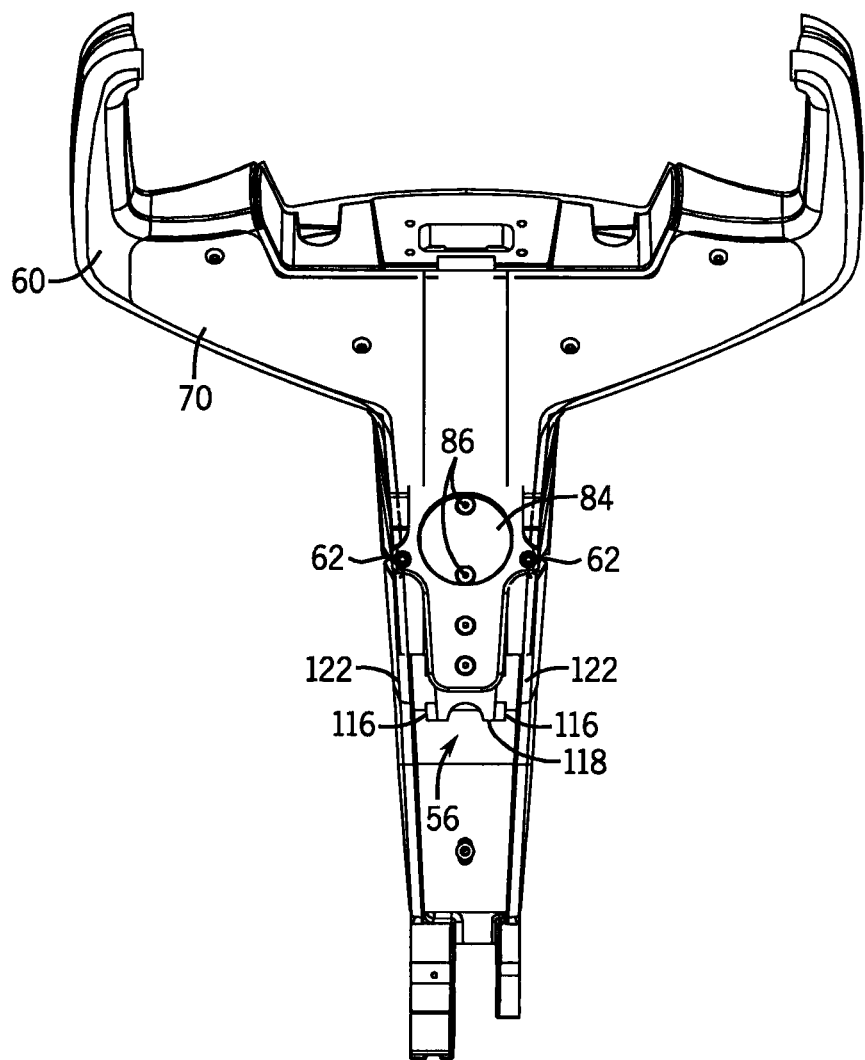
FIG. 4 is a bottom view of the steering mechanism of FIG. 1.
Figure 5:
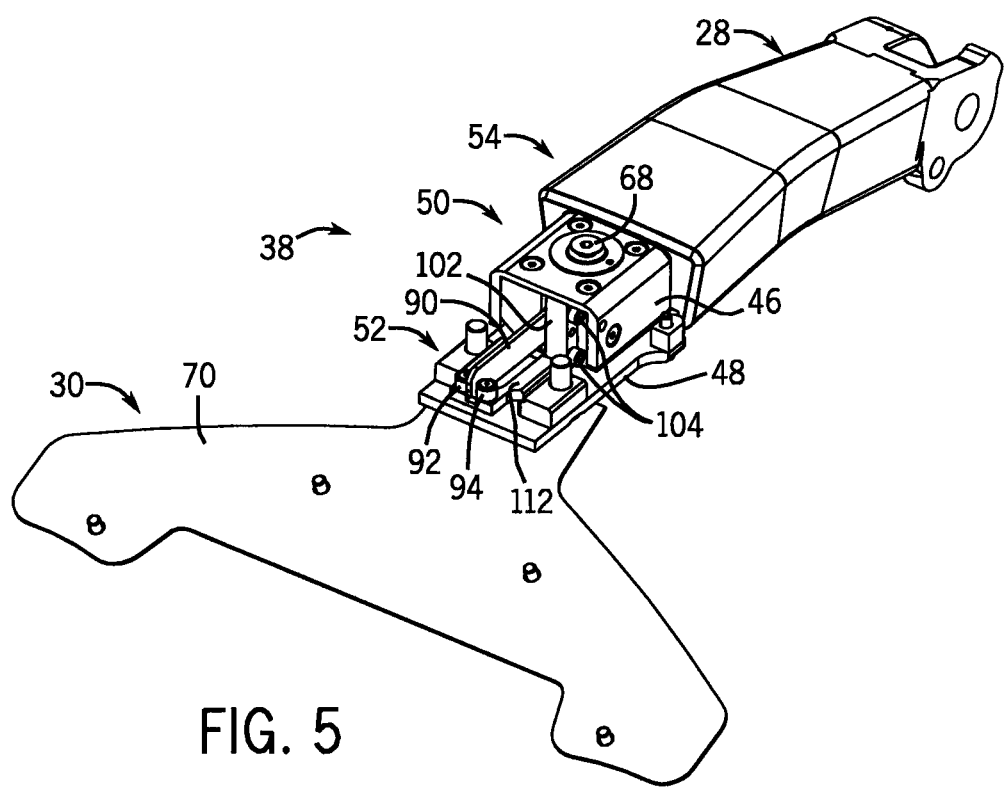
FIG. 5 is a perspective view similar to FIG. 2 with a top portion of the handle removed.
Figure 6:
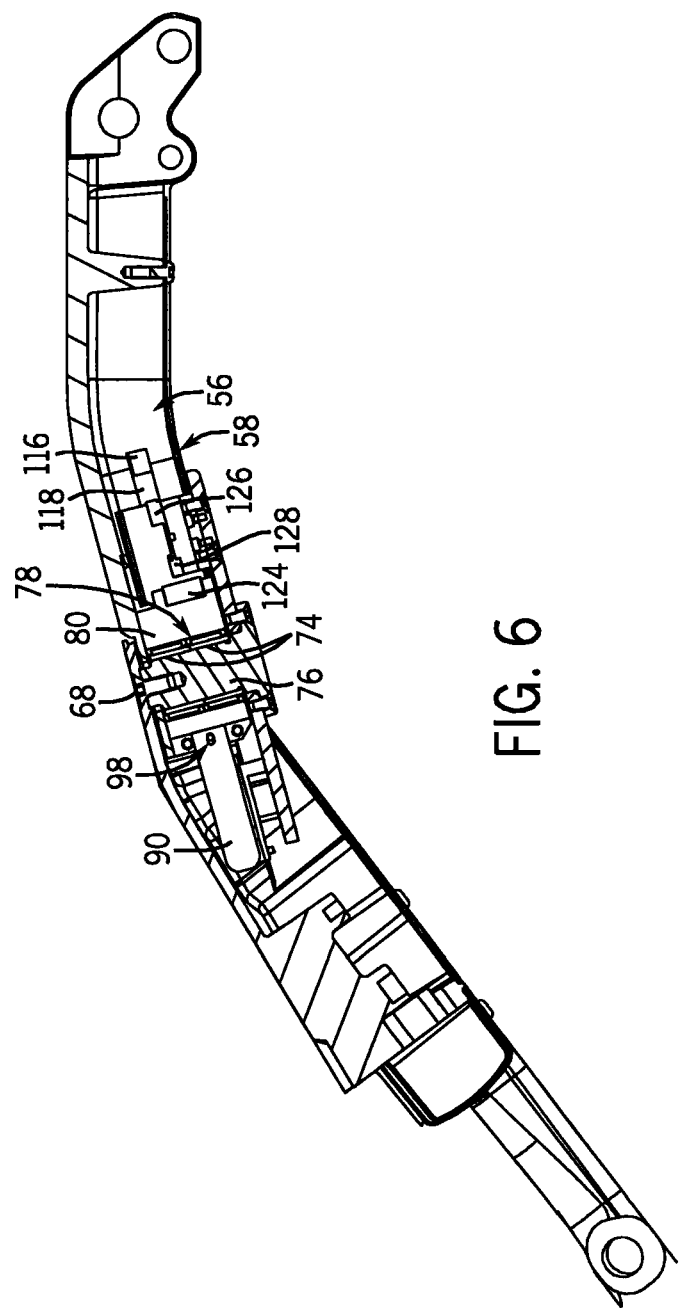
FIG. 6 is a cutaway side view taken along 6-6 of FIG. 2.
Figure 7:
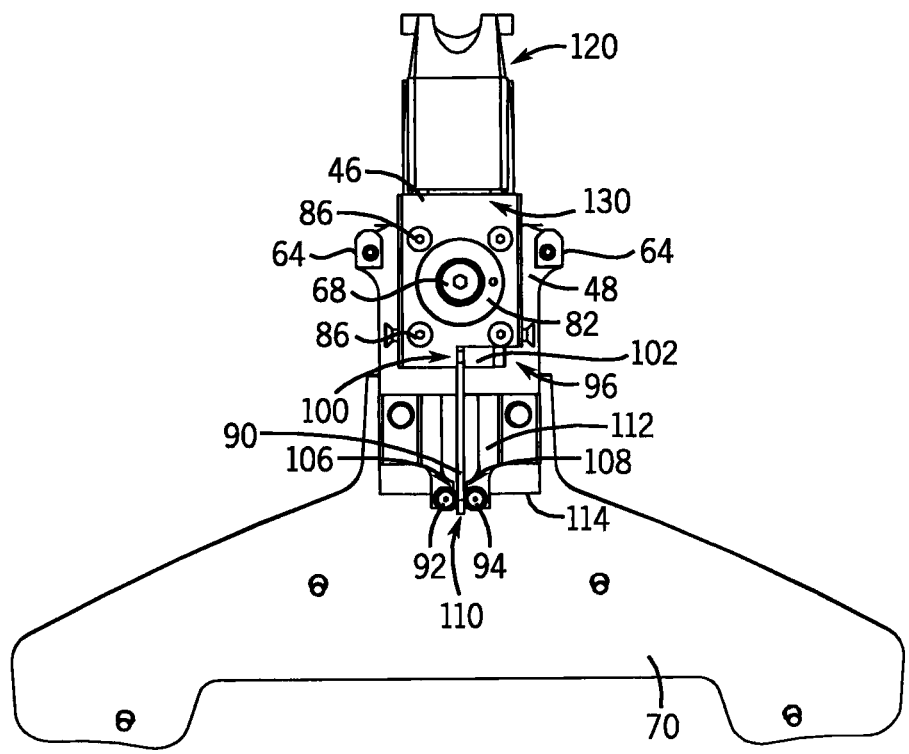
FIG. 7 is a top view of the steering mechanism with the top portion of the handle and the tiller arm removed.
Figure 8:
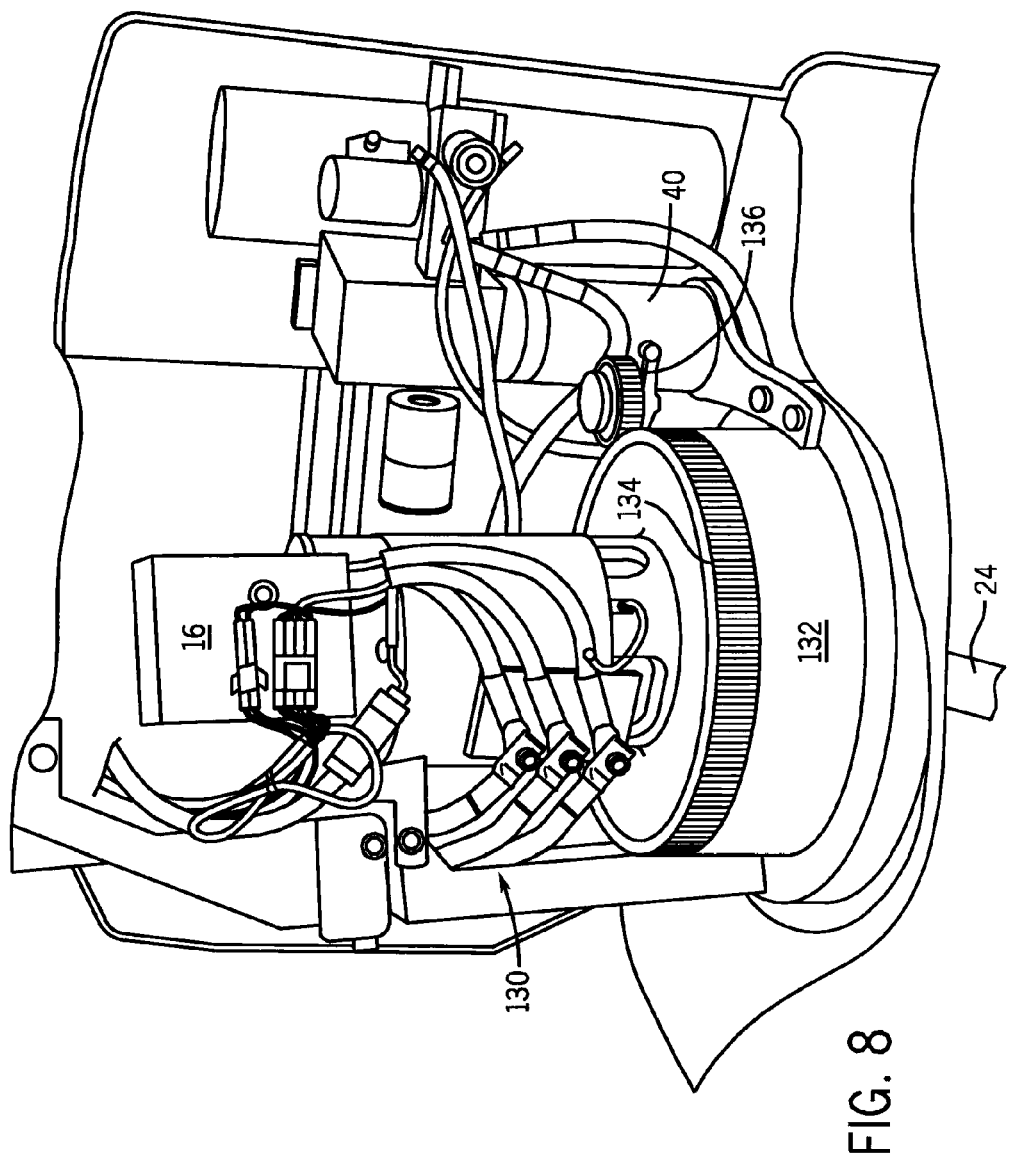
FIG. 8 is an illustration of the servomotor and associated traction motor of the pallet truck of FIG. 1.
Figure 9:
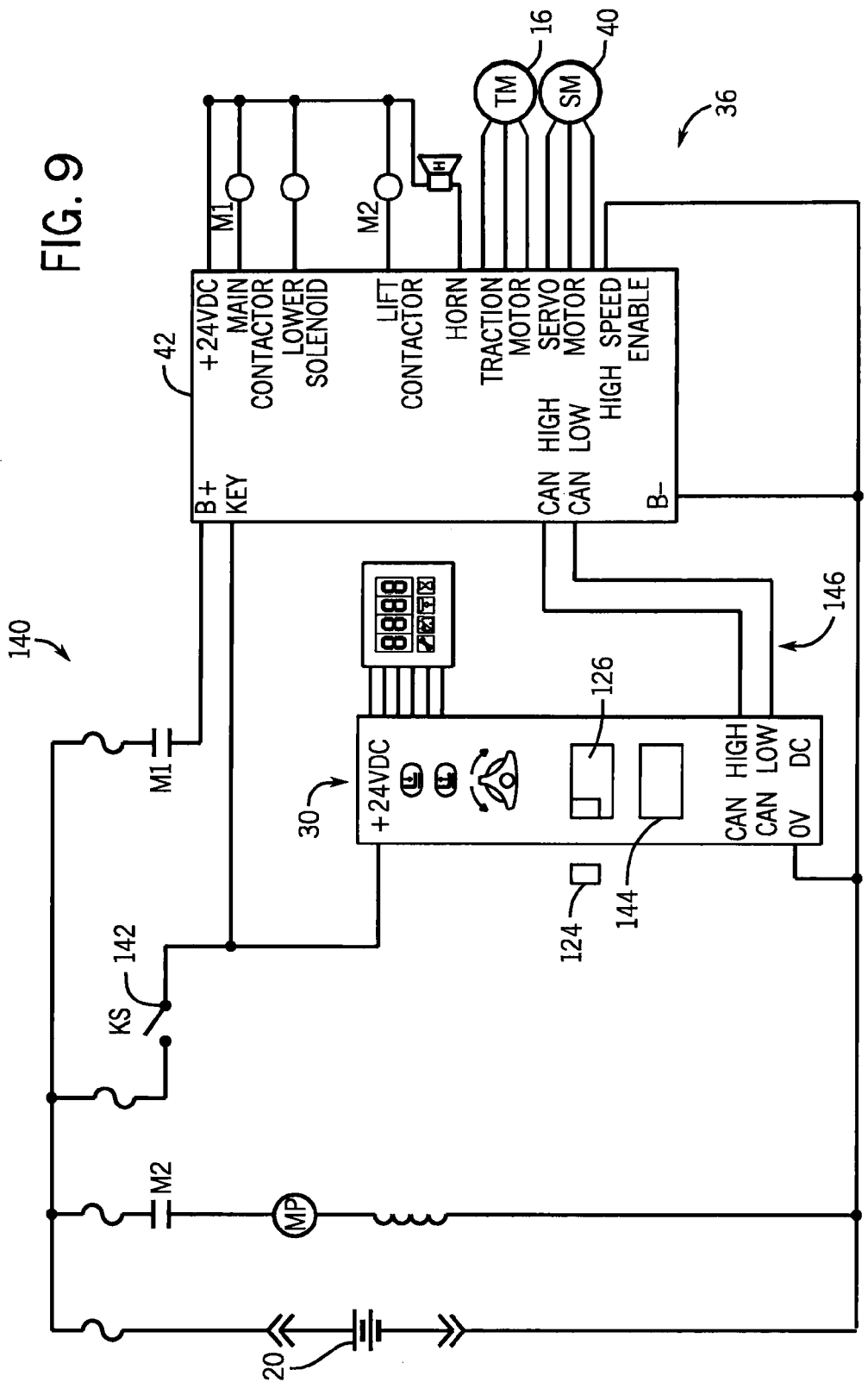
FIG. 9 is a block diagram of a portion of a control circuit for the pallet truck of FIG. 1.

Referring now to the figures and more particularly to FIGS. 1, 8, and 9, which show a motorized hand/rider low-lift pallet truck 10 incorporating the present invention. Directional terms such as "front," "rear," "top," "bottom," and the like are used with reference to the component orientations depicted in the drawing figures. These terms are used for illustrative purposes only and, unless otherwise noted, are not intended to limit the scope of the claims.

The pallet truck 10 includes a fork carriage 12 with a pair of load bearing forks 14, a traction motor 16 mounted in a motor compartment 18, a battery 20 secured in a battery compartment 22, and a steerable drive wheel 24. The drive wheel 24 is coupled to a steering mechanism 26 which includes a tiller arm 28 and a handle 30. The tiller arm 28 and handle 30 are mechanically connected via a flexible knuckle joint 32. The steering mechanism 26 is rotatable to the right and left about a steer axis 34 to steer the pallet truck 10 and movable between a substantially horizontal position and a substantially vertical position.

The pallet truck 10 further includes a power steering assist system 36 including a self-centering, torque-sensing joint assembly 38 that pivotally connects the handle 30 to the tiller arm 28, a servomotor 40 coupled to the drive wheel 24, and a controller 42. The amount of steering assist supplied by the servomotor 40 to the drive wheel 24 is determined by the controller 42 based primarily on the operator steering intent, as determined by the amount of measured torque, or steering force, applied to the handle 30 while the pallet truck 10 is operating. Other system inputs such as travel speed or load weight may also be considered.

Referring now also to FIGS. 2-7, the joint assembly 38 includes two primary structural components: a pivot housing 46 and a support plate 48. The joint assembly 38 further includes three functional components operatively connected to the housing 46 and/or support plate 48: a pivot assembly 50 which enables pivotal movement of the handle 30 relative to the tiller arm 28, a handle biasing mechanism 52 which provides resistance when a steering force is applied to the handle 30 and returns the handle 30 to a central, home position when the force is removed, and a torque sensing arrangement 54 which measures displacement of the handle 30 relative to the tiller arm 28, such displacement being directly proportional to the torque, or steering force, applied to the handle 30.

The pivot housing 46 is rigidly secured within a channel 56 formed in the bottom side 58 of the tiller arm 28 and is received into the handle 30 to form the flexible knuckle joint 32 therebetween. The support plate 48 is secured to a top section 60 of the handle 30 via a pair of mechanical fasteners 62 and spacers 64. The plate 48 extends beneath the pivot housing 46 and into the channel 56 of the tiller arm 28. An aperture 66 is provided to fasten the top section 60 of the handle 30 to the pivot assembly 50, and thus to the tiller arm 28, with a suitable mechanical fastener such as a cap screw 68.

A bottom section 70 of the handle 30 is fastened to the upper section 60 to complete the handle 30. A neck portion 72 of the handle 30 has the same generally rectangular cross sectional profile as the tiller arm 28 which along with the knuckle joint 32 therebetween, provides for a smoothly contoured steering mechanism 26. When a steering force is applied and moves the handle 30, the support plate 48, being affixed thereto, moves relative to the pivot housing 46, affixed to the tiller arm 28, and the functional components cooperate as described below.

The pivot assembly 50 includes a pair of needle bearings 74 and a pivot pin 76 disposed within a bore 78 formed in a pivot block 80, preferably formed of aluminum. The needle bearings 74 are arranged in a stacked configuration to provide sufficient rotatable support for the pivot pin 76. Suitable retainers 82, 84 provide axial retention of the pivot pin 76 and are secured to the support plate 48 via mechanical fasteners 86. Fasteners, such as cap screws 88, also secure the pivot block 80 to the housing 46.

The use of needle bearings 74 to provide pivoting in the joint assembly 38 provides a number of advantages over other types of bearings. First, the high load capacity of the needle bearings 74 allows for a reduced separation distance therebetween (needed for resisting a given bending load) thus permitting the low profile design of the tiller arm 28. Second, the needle bearings 74 have generally low wear and low amounts of lash, permitting a sturdy and rugged joint assembly 38 strong enough to endure even severe operating conditions. Third, the needle bearings 74 have very low friction compared to friction bearings, i.e., bushings, thereby helping to provide consistent centering after steering movements of the handle 30.

The handle biasing mechanism 52 includes a cantilevered beam spring 90 engaged with first and second cam followers, or rollers, 92, 94. The beam spring 90 extends from a front end 96 of the pivot housing 46 and into an engagement with the cam followers 92, 94. A fixed end 98 of the beam spring 90 is fastened to a datum surface 100 of the pivot housing 46 with a mounting piece 102 and mechanical fasteners 104. Opposing sides 106, 108 of a free end 110 of the beam spring 90 are engaged by the first, fixed cam follower 92 and the second, slot-mounted cam follower 94, respectively. The two cam followers 92, 94 are secured to a first mounting bracket 112 disposed at a front end 114 of the support plate 48.

Centering of the handle 30 is achieved by arranging the fixed cam follower 92 to bear against the side 106 of the beam spring 90 mounted to the datum surface 100. Thickness variations between different beam springs 90 do not affect the centering capability of the mechanism 52 because the slot-mounted cam follower 94 can be repositioned within the mounting slot, not shown, to achieve a zero lash position for the handle 30. This is possible because the clamping piece 102 used to secure the beam spring 90 to the pivot housing 46 and the slot-mounted cam follower 94 float on the same side 108 of the spring 90 to account for thickness variations thereof. Such a mechanism ensures that different thickness beam springs 90 are able to achieve the same precise and consistent centering of the support plate 48 and handle 30.

The use of the beam spring 90 to bias the handle 30 provides a number of advantages over conventional torsion bar assemblies. A typical torsion bar assembly would require tighter tolerances, a more complicated manufacturing process, and a large, unattractive bulge in the tiller arm 28.

The handle biasing mechanism 52 further includes two energy absorption bumpers 116 that provide redundant centering of the control handle 30 if either the beam spring 90 or beam mounting piece 102 is damaged. The bumpers 116 are affixed to a second mounting bracket 118 at a back end 120 of the support plate 48 and are disposed within the tiller arm channel 56 in close proximity to sides 122 thereof. The bumpers 116 are preferably formed of a shock-absorbing viscoelastic polymer such as Sorbothane® or other suitable dampening material. Sorbothane is a registered trademark of Sorbothane, Inc.

The torque determining arrangement 54 includes a permanent magnet 124 and a steer sensor circuit board 126 with a non-contact sensor 128. The magnet 124 is mounted to a back end of the pivot housing 46 disposed within the tiller arm 28. The steer sensor board 126 is affixed to the support plate 48 adjacent to the magnet 124. The sensor 128 preferably a magnetoresistive (MR) sensor, such as found in the HMC1501 magnetic displacement sensor available from Honeywell, Inc. The HMC1501 sensor contains a single saturated-mode Wheatstone bridge sense element that creates an output voltage with respect to the direction of the magnetic flux passing over the surface of the sensor 128. As such, the sensor 128 is sensitive to the direction, not the strength, of the magnetic field produced by the magnet 124, In operation, movement of the control handle 30 translates into movement of the support plate 48, causing the steer sensor board 126, including the sensor 128 to move relative to the magnet 124. The amount of deflection of the beam spring 90 is proportional to the amount of movement of the handle 30 relative to the tiller arm 28 and therefore can be used to determine the amount of steering force, i.e., torque, applied to the handle 30. As the board 126 moves laterally with respect to the magnet 124, the resistance across the MR sensor 128 changes accordingly. The resistance change in the sensor 128 is measured and converted into a voltage signal by the steer sensor board 126 and input to the controller 42. The signal represents the amount of movement of the handle 30 relative to the tiller arm 28 and is proportional to the applied force, or torque in the handle 30.

The use of a sensor 128 utilizing MR technology to determine the torque in the handle 30 provides a number of advantages over conventional sensors, including hall effect and strain gage sensors, used in known torque determining arrangements. First, the torque determining arrangement 54 is immune to normal production variables such as magnetic strength, gap size between the magnet 124 and sensor 128, and the like. This is advantageous for volume production of the joint assembly 38 by obviating the need for adjustments as found in conventional arrangements. Further, the MR sensor 128 has inherent immunity to variations in magnetic field strength attributable to temperature and/or dimensional change, unlike conventional sensors, such as hall effect sensors, strain gages, and the like.

The aforementioned bumpers 116 also dampen movement of the handle 30 including the steer sensor board 126. The dampening provided by the bumpers 116 allows the power steering system 36 to have increased sensitivity without suffering from dynamic instability. The increased sensitively enables a better fidelity between light steering movements of the handle 30 and the resulting changes in the heading angle of the drive wheel 24 and thus yields a more natural steering response. Further, the combination of the beam spring 90 and the bumpers 116 provides an angle-offset vs. torque relationship that allows the use of position sensing technology, such as MR technology, to determine a torque signal, regardless of the orientation of the torque determining arrangement 54.

Referring now also to FIG. 8, in a preferred embodiment of the invention, the power steering system 36 includes a steer drive unit 130 including the traction motor 16, an associated gear box 132, and the drive wheel 24. The drive unit 130 further includes a ring gear 134 coupled to an output gear 136 of the servomotor 40, such that rotation of a servomotor shaft (not shown) causes rotation of the associated output gear 136. The output gear 136, being coupled to the ring gear 134, effects rotation of the drive unit 130 and changes the angular position of the drive unit 130 with respect to the steer axis 34 of the truck 10, resulting in desired steering directional changes.

Referring now also to FIG. 9, a simplified block diagram of part of a control system 140 of the pallet truck 10 is shown. The control system 140 is powered by the battery 20 and activated by a key switch 142. The control system 140 further includes a microprocessor 144 contained within the operator control handle 30 and the motor controller 42. The status of various switches, buttons, and other actuators comprising inputs in the control handle 30 are continuously monitored by the microprocessor 144 and regularly communicated to the motor controller 42 via a CAN (controller area network) bus 146.

Based on the status of the inputs, the motor controller 42 energizes or de-energizes one or more of the outputs. The motor controller 42 also performs as a variable drive for the pallet truck 10 by regulating the speed output to the traction motor 16 in accordance with a desired speed input. The motor controller 42 also controls the steering output to the servomotor 40 in accordance with the operator steering intent detected via the torque sensing arrangement 54 including the magnet 124 and steer sensor circuit board 126 with the non-contact sensor 128.

As previously mentioned, the steering force applied to the handle 30 by an operator causes deflection of the handle 30 relative to the tiller arm 28, via the joint assembly 38. Relative movement of the handle 30 is limited by edges 148, 150 of the handle 30 and tiller arm 28, respectively, on opposing sides of the joint 32 that act as mechanical stops. The amount of movement is proportional to the deflection of the spring 90 in the joint assembly 38 and likewise to the amount of steering force applied to the handle 30 by the operator. The controller 42 monitors movement of handle 30 via the MR sensor 128 and, based on the determined amount of steering force, among other inputs, produces an appropriate steering assist output signal. The controller 42 directs this signal to a steer servomotor board 152 which controls the servomotor 40 to adjust the heading angle of the drive wheel 24 accordingly.

In an alternate embodiment, the handle biasing mechanism may be designed with sufficient pivoting or translating action to provide torque-proportional position change and thus, needle bearings and a pivot pin would not be needed. The pivot assembly may be replaced with a sliding mechanism that provides linear translation of the upper handle relative to the tiller arm. The tiller arm could be constructed as a bending-beam mechanism similar to the design of a typical torque wrench.

In an alternate joint assembly embodiment, the joint is formed with a pivoting bearing and a load cell device positioned to the side of the pivot and fixed to the tiller arm. The load cell element is actuated by a threaded rod which is anchored to the handle. As the handle is flexed about the pivot point, the threaded rod exerts a pulling or pushing force on the load cell element and a measurable change in the resistance of the load cell strain gage results. It is further contemplated that physical stops would be provided in the joint on each side of the pivot point in order to prevent damage to the load cell device.

In yet another alternate joint assembly embodiment, the pivot joint is provided by a piece of thick plate steel cut to have an integral return spring. Depending on the configuration of the cut, the steel piece can provide nearly straight lateral motion or curved motion. Either of which could be used with non-contact position sensor or as the basis for a strain gage.

Figure 10:
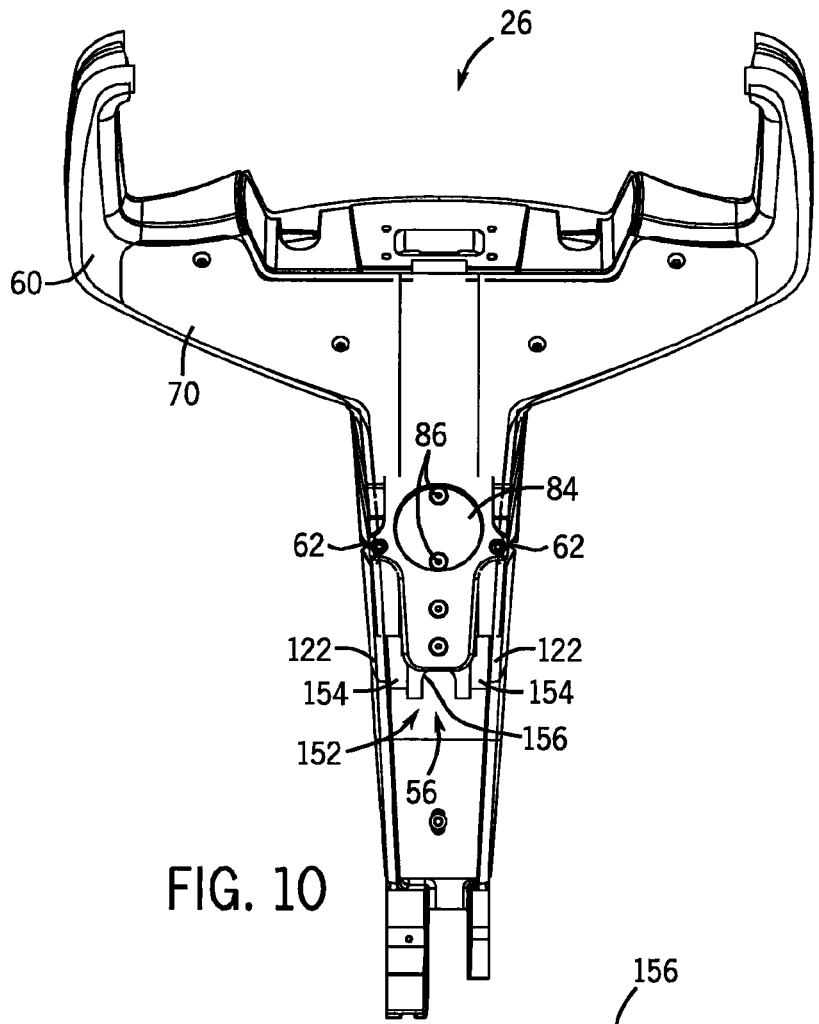
FIG. 10 is a bottom view of another embodiment of the present invention including an alternate handle biasing mechanism.

In yet another alternate embodiment of the steering mechanism 26 in the pallet lift truck 10 described above, the handle biasing mechanism 52 described above is replaced or augmented with a handle centering mechanism 153 described below and shown in FIGS. 10 and 11. In FIG. 10, the alternate handle centering mechanism 153 includes two energy absorption bumpers 154 affixed to a mounting bracket 156, shown in FIG. 11, at a back end 120 of the support plate 48, shown in FIG. 7, and are disposed within the tiller arm channel 56. The bumpers 154 are sandwiched between the bracket 156 and sides 122 of the channel 56, such that both bumpers 154 are compressed, or preloaded, between the bracket and respective side 122 of the channel 56 when the tiller arm is in a neutral, or center, position. Advantageously, the preloading of the bumpers ensures discrete centering of the tiller arm.

The damping characteristics and spring rate of the bumpers 154 are dependent upon the bumper material type and composition having a desired compression modulus, durometer, and cross sectional area. In this embodiment, the bumpers 154 are preferably formed of a shock-absorbing silicone rubber such as Cohrlastic 400® or other dampening material having similar characteristics. Advantageously, the preferred bumper material has good damping characteristics that prevents oscillation of the tiller arm when released to return to the neutral position and provides consistent performance throughout a range of operating temperatures, such as between −20 F and 120 F.

Figure 11:
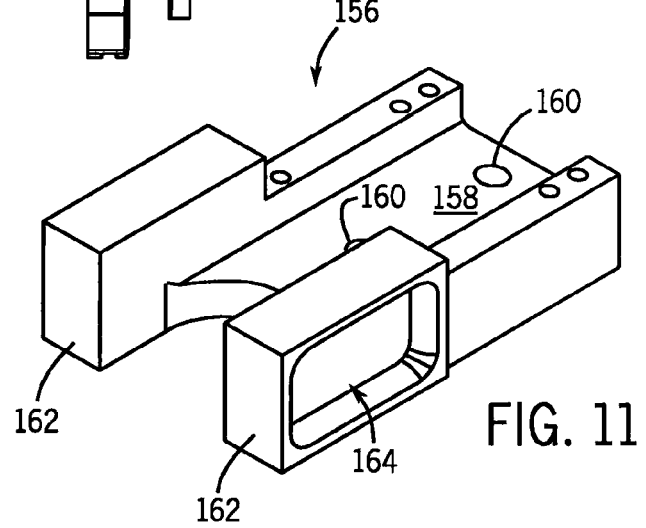
FIG. 11 is a perspective view of the bracket of the handle biasing mechanism of FIG. 10.

The rigid bracket 156 shown in FIG. 11 includes a base 158 having a pair of outwardly facing bumper mounting arms 162. Each bumper mounting arm 162 includes an outwardly opening cavity 164 for receiving one of the bumpers 154. Preferably, the bracket 156 is secured to the support plate 48, and thus the handle 30, using a mechanical fastener, such as bolts extending through, or threadably engaging, holes 160 formed in the bracket base 158. Of course, the bracket 156 can be secured to the handle 30 using other methods in the art, such as welding, adhesives, and the like without departing from the scope of the invention.

In a preferred embodiment, each cavity 164 is generally rectangular approximately one inch long and 0.6 inches wide. Each bumper 154 is secured in one of the cavities 164 using methods known in the art, such as a friction fit, adhesives, and the like. Although a rectangular cavity 164 is shown, the cavities 164, and thus the bumpers 154 can have other shapes providing a desired cross section area without departing from the scope of the invention. Moreover, the bumpers 154 can also be secured to the bracket 156 without cavities using methods known in the art without departing from the scope of the invention. In addition, although mounting the preloaded bumpers 154 to the rigid bracket 156 secured to the handle is preferred, the bumpers 154 can be fixed to the tiller arm channel 56 and engaging the bracket 156 or other structure secured to the handle 30 without departing from the scope of the invention.

In use, a steering input causes the handle 30 to shift out of the neutral position. As the handle 30 moves from the neutral position, the compression of one bumper 154 increases while the compression of the opposing, or other, bumper 154 decreases. The disproportionate compression of the two opposing bumpers 154 provides a proportionally increasing force feedback as the operator moves the handle 30 out of the neutral position. Advantageously, the spring rate provided by the Cohrlastic 400® bumper material provides a desired amount of force feedback for each unit of displacement of the handle 30. When the handle 30 is released, the spring force in the bumper 154 having the greater compression returns the handle to the neutral position. As the handle 30 approaches the neutral position, the opposing, or other, bumper 154, is compressed returning the compression of this other bumper 154 to the neutral preloaded state of compression.

Preferred embodiments and examples of the invention have been described in considerable detail. Many modifications and variations to the preferred embodiment described will be apparent to a person of ordinary skill in the art. It should be understood, therefore, that the methods and apparatuses described above are only illustrative and do not limit the scope of the invention, and that various modifications could be made by those skilled in the art that would fall within the scope of the invention.

To apprise the public of the scope of this invention, the following claims are made:

We claim:

1. A steering mechanism for a material handling vehicle, the steering mechanism comprising:
   a handle;
   a tiller arm coupled to the handle via a flexible joint allowing relative movement of the handle about the tiller arm; and
   a handle centering mechanism including a first end fixedly secured to the handle and a second end extending into a channel of the tiller arm, the second end compressing bumpers disposed on opposing sides of said second end, said bumpers urging said handle toward a neutral position wherein when a force is applied to move the handle away from a home position relative to the tiller arm, one of said compressed bumpers of said pair of compressed bumpers is further compressed, and when the force is removed, the handle is returned to the home position by action of the pair of compressed bumpers.

2. The steering mechanism as in claim 1, wherein said pair of compressed bumpers are fixed to said second end by a mounting bracket secured to said second end.

3. The steering mechanism as in claim 2, in which said mounting bracket includes cavities, each of said cavities receiving one of said bumpers.

4. The steering mechanism as in claim 1, including a torque determining arrangement comprising a sensor fixed relative to one of said handle and said tiller arm and a magnet fixed relative to the other of said handle and said tiller arm, said magnet having a magnetic field and said sensor produces a signal responsive to a change in direction of the magnetic field as seen by the sensor.

5. A steer assist system for a material handling vehicle having a steerable drive wheel, the steer assist system comprising:
   a steering mechanism as in claim 1, and including:
      a joint assembly forming at least part of the flexible joint, the joint assembly including:
         a pivot assembly,
         the handle centering mechanism,
         a torque determining arrangement comprising a sensor fixed relative to one of said handle and said tiller arm and a magnet fixed relative to the other of said handle and said tiller arm, said magnet having a magnetic field and said sensor produces a signal responsive to a change in direction of the magnetic field as seen by the sensor;
      an electric motor operable to adjust a heading angle of the drive wheel; and a controller which, upon receiving the signal from the torque determining arrangement, directs the electric motor to adjust the heading angle of the drive wheel based, at least in part, on the signal.

6. The steer assist system of claim 5, wherein the pivot assembly comprises:
a pivot block comprising a cavity;
at least one bearing assembly disposed within the cavity; and
a pivot pin supported by the at least one bearing assembly within the cavity.

7. The steer assist system of claim 6, wherein the at least one bearing assembly is two needle bearings disposed within the cavity in a stacked arrangement.

8. The steer assist system of claim 6, wherein the pivot block is fixedly secured to the tiller arm and the pivot pin is fixedly secured to the handle.

9. The steer assist system of claim 5, wherein the magnet is disposed within one of the handle and the tiller arm and the sensor is disposed within the other of the handle and the tiller arm.

10. The steer assist system of claim 5, wherein the torque determining arrangement further comprises an electrical circuit for converting the change in direction of the magnetic field into a signal useable by the controller.

11. The steer assist system of claim 5, wherein the magnet is a permanent magnet and the sensor is a magnetoresistive (MR) sensor.

12. The steer assist system of claim 5, including a handle biasing mechanism comprising:
a beam spring having a fixed end secured within the tiller arm and a free end extending into the handle;
wherein when the handle is moved relative to the tiller arm, the beam spring is biased away from a neutral position.

13. The steer assist system of claim 12, wherein the handle biasing mechanism further comprises a pair of cam followers disposed within the handle, the cam followers engaging opposing sides of the free end of the beam spring.

14. The steer assist system of claim 13, wherein the handle biasing mechanism further comprises a support bracket for the cam followers disposed in the handle, wherein one of the cam followers is fixedly mounted to the support bracket and the other of the cam followers is a slidably mounted cam follower to the support bracket within a slot such that the slidably mounted cam follower is adjustable to provide a zero lash position for the beam spring.

15. The steer assist system of claim 5, wherein the motor is a servomotor.

16. The steer assist system of claim 15, wherein the servomotor is coupled to an output gear and the output gear is further coupled to a ring gear, the ring gear being an integral part of a drive unit assembly including the drive wheel.

* * * * *